United States Patent
Asgari et al.

(10) Patent No.: US 10,734,874 B2
(45) Date of Patent: Aug. 4, 2020

(54) APPARATUS AND METHOD FOR COGGING TORQUE REDUCTION WITH ROTOR EMBEDDED CYLINDROID PERMANENT MAGNETS

(71) Applicants: Shahin Asgari, Kangavar (IR); Seyed Mojtaba Aghamirsalim, Tehran (IR)

(72) Inventors: Shahin Asgari, Kangavar (IR); Seyed Mojtaba Aghamirsalim, Tehran (IR)

(*) Notice: Subject to any disclaimer, the term of this patent is extended or adjusted under 35 U.S.C. 154(b) by 491 days.

(21) Appl. No.: 15/645,973

(22) Filed: Jul. 10, 2017

(65) Prior Publication Data
US 2018/0019648 A1   Jan. 18, 2018

Related U.S. Application Data

(60) Provisional application No. 62/360,351, filed on Jul. 9, 2016.

(51) Int. Cl.
| | | |
|---|---|---|
| *H02K 16/04* | (2006.01) | |
| *H02K 1/27* | (2006.01) | |
| *H02K 7/08* | (2006.01) | |
| *H02K 21/12* | (2006.01) | |
| *H02K 21/16* | (2006.01) | |
| *H02K 21/22* | (2006.01) | |
| *H02K 1/14* | (2006.01) | |

(52) U.S. Cl.
CPC ............. *H02K 16/04* (2013.01); *H02K 1/146* (2013.01); *H02K 1/27* (2013.01); *H02K 7/085* (2013.01); *H02K 21/12* (2013.01); *H02K 21/16* (2013.01); *H02K 21/22* (2013.01); *H02K 7/083* (2013.01)

(58) Field of Classification Search
CPC .......... H02K 16/04; H02K 1/146; H02K 1/27; H02K 7/085; H02K 21/12; H02K 21/16; H02K 21/22; H02K 7/083
See application file for complete search history.

(56) References Cited

U.S. PATENT DOCUMENTS

| | | | | |
|---|---|---|---|---|
| 2,131,436 | A * | 9/1938 | Howell | H02K 99/00 |
| | | | | 310/156.08 |
| 2,230,878 | A * | 2/1941 | Bohli | H02K 21/16 |
| | | | | 310/156.55 |
| 2,256,907 | A * | 9/1941 | Ochsenbein | H02K 21/16 |
| | | | | 123/149 A |
| 3,469,132 | A * | 9/1969 | Haydon | H02K 21/185 |
| | | | | 310/163 |

(Continued)

FOREIGN PATENT DOCUMENTS

| | | |
|---|---|---|
| CN | 102957260 A | 3/2013 |

OTHER PUBLICATIONS

Gyeong-Chan Lee and Tae-Uk Jung, Cogging Torque Reduction Design of Dual Stator Radial Flux Permanent Magnet Generator for Small Wind Turbine, IEEE 2013 Tencon—Spring, pp. 85-89 (Abstract)

*Primary Examiner* — Mohamad A Musleh
(74) *Attorney, Agent, or Firm* — Bajwa IP Law Firm; Haris Zaheer Bajwa

(57) ABSTRACT

A rotor supports embedded cylindroid permanent magnets, extending parallel to the rotor axis, and transversely magnetized with a respective magnetization direction radial to the rotor axis. The rotor is concentric to an inner stator and an outer stator. The embedded cylindroid permanent magnets include an arcuate surface facing the outer stator teeth concurrent with an arcuate surface facing the inner stator teeth.

20 Claims, 11 Drawing Sheets

(56) References Cited

U.S. PATENT DOCUMENTS

| | | | | |
|---|---|---|---|---|
| 3,646,376 A | * | 2/1972 | Anderson | G01P 3/465 |
| | | | | 310/156.64 |
| 4,207,483 A | * | 6/1980 | Baer | H02K 37/125 |
| | | | | 310/164 |
| 4,633,109 A | * | 12/1986 | Feigel | H02K 3/47 |
| | | | | 310/68 R |
| 4,766,362 A | * | 8/1988 | Sadvary | H02K 21/028 |
| | | | | 310/90 |
| 4,769,567 A | | 9/1988 | Kurauchi et al. | |
| 7,880,358 B2 | | 2/2011 | Taniguchi et al. | |
| 2001/0048264 A1 | | 12/2001 | Trago et al. | |
| 2014/0103768 A1 | * | 4/2014 | Brahmavar | H02K 21/16 |
| | | | | 310/156.08 |

* cited by examiner

APPARATUS AND METHOD FOR COGGING TORQUE REDUCTION WITH ROTOR EMBEDDED CYLINDROID PERMANENT MAGNETS

CROSS REFERENCE TO RELATED APPLICATION

This application claims the benefit of priority from U.S. Provisional Patent Application Ser. No. 62/360,351 filed Jul. 9, 2016, and entitled "A DOUBLE-STATOR MACHINE WITH CYLINDRICAL PM SHAPE," which is incorporated by reference herein in its entirety.

TECHNICAL FIELD

The present disclosure generally relates to a permanent magnet machine, and particularly to permanent magnets and togging torque in double stator permanent magnet brushless (PMBL) motors.

BACKGROUND

Permanent magnet brushless (PMBL) motors can exhibit efficiency and power density suitable for a range of applications. One type of PMBL motor, referred to as a "double-stator PMBL" (DS-PMBL), uses an inner stator, surrounded by a rotor carrying permanent magnets, in turn surrounded by an outer stator. The inner stator and outer stator carry respective stator windings, and these are energized to produce rotating inner and outer magnetic fields. The inner and outer rotating fields each interact with the rotor's permanent magnets and the interactions urge separate, identical direction, torques. The DS-PMBL motor, by that combination of torques urged on the rotor by the inner and outer stator fields, can produce higher torque than a single-stator PMBL.

Among parameters specifying DS-PMBL motors is the number of poles. The number of poles can be significant parameter because increasing the number, subject to various constraints and conditions, can relate to increase in torque density. However, employing conventional techniques of DS-PMBL rotor and PM structure and design, there can be certain significant costs to increasing the number of poles. One of such costs is a phenomenon known as "cogging torque," which can manifest as a periodically modulated torque on the rotor. Cogging torque can be a greater issue with DS-PMBL motors because such motors possess two air gaps. Another cost, or group of costs, that can arise from the current rate of increase in design, materials and fabrication costs, and costs of necessary over-design, conventional DS-PMBL rotor and PM structures for higher pole count, and resulting costs, for example, fabrication, and materials.

SUMMARY

In one general aspect, the present application describes a permanent magnet electric motor. The permanent magnet electric motor includes a rotor, extending along a rotor axis, and rotatably supported by a support member for rotation about the rotor axis, and a plurality of cylindroid permanent magnets, mounted to the rotor at respective positions along a reference circle concentric with the rotor axis. Each of the cylindroid permanent magnets extends along an axis parallel to the rotor axis, and is transversely magnetized with a respective magnetization direction that is radial to the rotor axis. The permanent magnet electric motor further includes a stator, coupled to the support member, and aligned with the rotor axis.

The above general aspect may include one or more of the following features. At least one of the cylindroid permanent magnets may be a cylindrical permanent magnet, and may extend along a cylinder axis, the cylinder axis extending parallel to the rotor axis and within a cavity in which the cylindrical permanent magnet is mounted. At least one of the plurality of cylindroid permanent magnets may be transversely magnetized in a first transverse direction, the first transverse direction being toward the rotor axis, and at least one of the plurality of cylindroid permanent magnets may be transversely magnetized in a second transverse direction, the second transverse direction being away from the rotor axis.

The plurality of cylindroid permanent magnets may include N cylindroid permanent magnets, N being an integer greater than two. N/2 of the transversely cylindroid permanent magnets may be transversely magnetized in the first transverse direction. N/2 of the transversely cylindroid permanent magnets may be transversely magnetized in the second transverse direction. The rotor may include structure forming a plurality of cavities, and the plurality of cavities are aligned at the respective positions along the reference circle, and each of the cylindroid permanent magnets is mounted within a respective one of the cavities. The rotor may include a rotor outer surface that is generally concentric to the rotor axis and that faces away from the rotor axis. The rotor may also include for each of the cavities, an opening to an area on the rotor surface and extending parallel to the rotor axis. A surface of the cylindroid permanent magnet mounted within the cavity may project through the opening, forming a projection that is above the outer surface of the rotor and runs parallel to the rotor axis.

The cylindroid permanent magnet mounted within the cavity may be a cylindrical permanent magnet, extending along a cylinder axis and having a radius that is normal to the cylinder axis. The projection may form a radius equal to radius of the cylindrical permanent magnet. The projection may have a width at the outer rotor outer surface, and the width may be less than the radius of the cylindrical permanent magnet.

The stator may be an outer stator, the projection may be an outward projection, and the opening may be a first opening. The permanent magnet electric motor may further include: an inner stator, coupled to the support member and aligned with the rotor axis. The rotor may further include: a rotor inner surface that faces toward the inner stator, and for each of the cavities, a second opening out to the rotor inner surface, and running in a direction parallel to the rotor axis. A surface of the cylindroid permanent magnet mounted within the cavity may project through the second opening, forming an inward projection that is inward of the inner surface of the rotor, in a radial direction toward the rotor axis, and runs parallel to the outward projection.

At least one of the cylindroid permanent magnets may be a cylindrical permanent magnet, and may extend along a cylinder axis, the cylinder axis extending parallel to the rotor axis and within the cavity in which the cylindrical permanent magnet is mounted. A first cylindroid permanent magnet, among the plurality of cylindroid permanent magnets may be transversely magnetized in a first transverse direction, and the cavity in which the first cylindroid permanent magnet may be mounted is a first cavity. A second cylindroid permanent magnet, among the plurality of cylindroid permanent magnets may be transversely magnetized in a second transverse direction, opposite the transverse direction, and the cavity in which the second cylindroid permanent magnet may be mounted is a second cavity. At a given rotational position of the rotor, a concurrent alignment may be formed, the concurrent alignment may include a first mutual alignment, including an alignment of the outward projection of the first cylindroid permanent magnet, with a first tooth of the outer stator, and an alignment of the inward projection of the first cylindroid permanent magnet with a first tooth of the inner stator, and concurrent with the first mutual alignment, a second mutual alignment, the second mutual alignment including an alignment of the outward projection of the second cylindroid permanent magnet with a second tooth of the outer stator, and an alignment of the inward projection of the second cylindroid permanent magnet with a second tooth of the inner stator, the first tooth of the outer stator being adjacent the second tooth of the outer stator.

The first cylindroid permanent magnet, the second cylindroid permanent magnet, the first tooth and the second tooth of the outer stator, the first tooth and the second tooth of the inner stator may be configured to form, in the concurrent alignment, a flux path. The flux path may pass: from the first tooth of the outer stator, into the outward projection of the first cylindroid permanent magnet, then transversely through the first cylindroid permanent magnet, in an alignment with the first transverse magnetization direction, and from the inward projection of the first cylindroid permanent magnet into the first tooth of the inner stator, then from the first tooth of the inner stator to the second tooth of the inner stator, then from the second tooth of the inner stator to the second into the inward projection of the second cylindroid permanent magnet, then transversely through the second cylindroid permanent magnet, in an alignment with the second transverse magnetization direction, and then from the outward projection of the second cylindroid permanent magnet into the second tooth of the outer stator.

DETAILED DESCRIPTION

In the following detailed description, numerous specific details are set forth by way of examples to provide persons of ordinary skill in the pertinent field a thorough understanding of the disclosed subject matter. However, it will be apparent such persons, upon reading this disclosure, that the present teachings may be practiced without such details. In other instances, well known techniques, structures and components that, upon reading this description, can be utilized have been described at a relatively high-level, without detail, to avoid obscuring concepts.

As will be understood and appreciated by persons of ordinary skill, various of the concepts, aspects, and implementations that are described in reference to a motor can be applied to a generator. Accordingly, as used in this disclosure, the term "motor" will be understood to mean "motor or generator," except in instances where another meaning is explicitly stated, and instances where it is clear from the context that "motor or generator" is not intended.

As used in this disclosure, "convex arc direction" means, for a given convex arc, an average, over the length of the convex arc, of the normal to the tangent to the arc.

As used in this disclosure, "cylindroid" means a three-dimensional form extending along a center axis, having a first convex arcuate portion and a second convex arcuate portion, extending mutually parallel to one another and to the center axis, and having in a cross-section plane normal to the center axis a cross sectional profile that includes a first convex arc and a second convex arc, where the convex arc direction of the first convex arc is opposite the convex arc direction of the second convex arc.

To assist in the introduction of certain concepts and features, portions of a conventional technique for design and implementation of permanent magnets in DS-PMBL motors will be briefly described. The particular technique includes surface mounting of a PM, having a particular shape, on a particularly configured outer support structure of a rotor.

Figure 1:
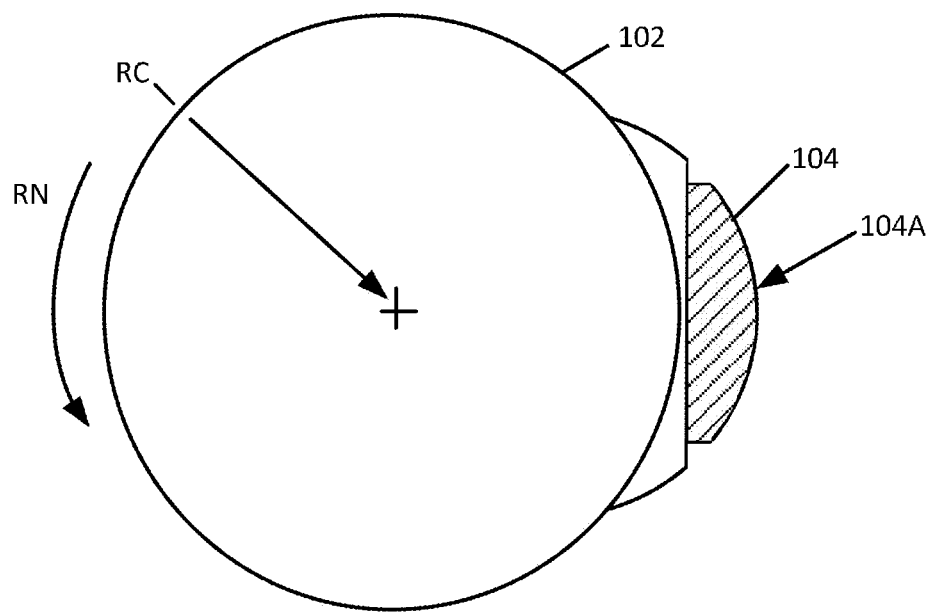
FIG. 1 illustrates an example of one conventional PM structure.

FIG. 1 illustrates an example of one conventional PM structure. The conventional PM structure includes a rotor 102, rotatably supported, for example, by a motor housing (not visible in FIG. 1) to rotate, for example in direction RN, about a rotor axis RC. Affixed to an outer surface or region of the rotor 102, on respective surface support or surface mounting structures, is a plurality of permanent surface magnets, of which permanent surface magnet 104 is an example. A related art technique directed at reducing, cogging torque included configuring the permanent surface magnet(s) 104 with an arc-shaped outer surface 104A. However, this technique has shortcomings. For example, it necessitates a polygonal cross section for the rotor core. Such a structure can be costly to fabricate. In addition, such a structure can be prone to vibration. Other shortcomings include cost and reliability related to the mounting of the permanent surface magnet(s) 104.

Figure 2A:
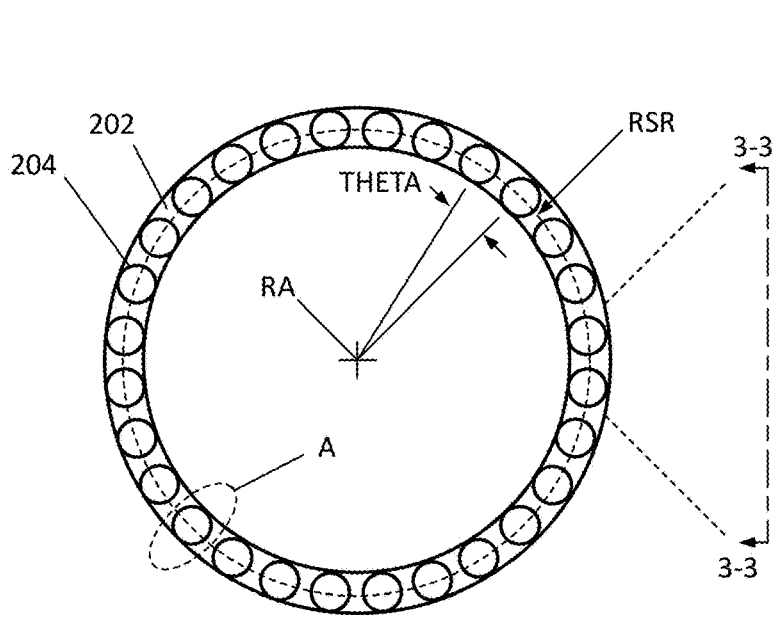
FIGS. 2A-2B illustrate, respectively, other aspects and an expanded view of certain features and implementations thereof, in an example high pole count embedded cylindroid PM (ECPM) structure according to one or more aspects of the present disclosure.
Figure 2B:
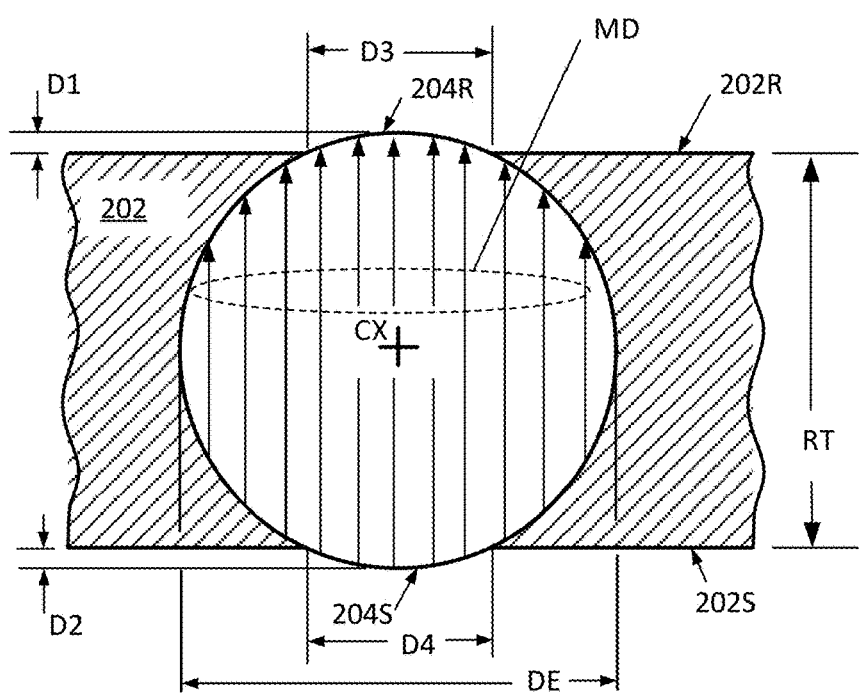

FIG. 2A illustrates a front projection of one implementation 200 of an example embedded cylindroid PM rotor structure, hereinafter referred to as "ECPM rotor assembly 200," according to one or more aspects of the present disclosure. FIG. 2B is an expanded view of the FIG. 2A region labeled "A."

Referring to FIG. 2A, the ECPM rotor assembly 200 can include an ECPM rotor 202 configured to support, in an embedded configuration, a plurality of permanent magnets (PMs) 204, each having a cylindroid form and extending along a respective center axis CX, such as the example cylinder form illustrated in cross-section by the FIG. 2B expanded view of the FIG. 2A region labeled "A."

The plurality of ECPMs 204 can include N ECPMs 204, N being an integer greater than or equal to two. The ECPM rotor 202 can be configured such that respective center axes CX are arranged or distributed on a reference circle, such as the example reference circle RSR. The embeddable ECPM rotor 202 can be, but is not necessarily, structured such that the N ECPMs 204 are arranged such their respective center axes CX are equally spaced by an equal angular spacing, labeled Theta. The ECPM rotor 202 can be implemented with structure, such as illustrated by examples described in greater detail later in this disclosure, enabling the ECPM rotor 202 to be supportable, for example, by structures such as a motor or generator housing (not visible in FIG. 2A), to be rotatable about a rotor axis RA.

Figure 3:
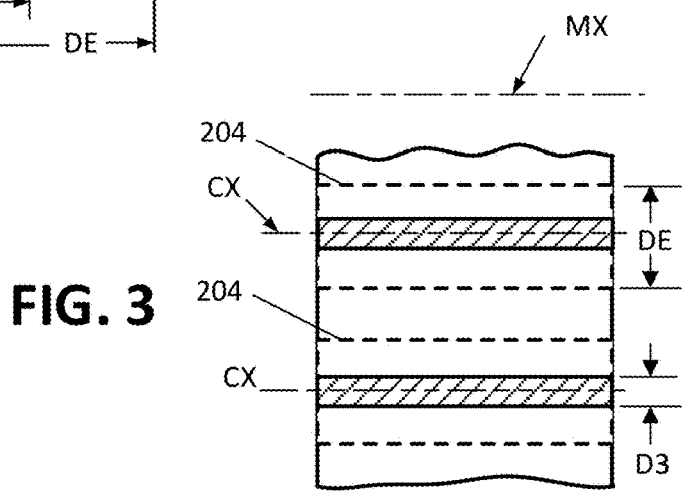
FIG. 3 illustrates an expanded projection 3-3 of FIG. 2A.

FIG. 3 illustrates an enlarged view of the FIG. 2A projection 3-3, showing in dotted lines portions of two of the ECPMs 204 that are embedded within the ECPM rotor 202. Reference line MX is parallel to the rotor axis RA. As illustrated, the center axes CX extend parallel to the rotor axis RA.

Referring again to FIG. 2B, the ECPM rotor 202 can be configured with a rotor outer surface 202R and a rotor inner surface 202S. In a region that can be termed an "ECPM support region" (visible in part in FIG. 2B, but not separately labeled) the ECPM rotor 202 include a rotor outer surface 202R and a rotor inner surface 202S, spaced apart in a direction radial from the rotor axis RA, by a rotor thickness RT. In an implementation, a structure that will be referred to as "cavities" (visible in part in FIG. 2B, but not separately labeled) can be formed or included within the rotor thickness RT. The cavities can be formed to accommodate and support a corresponding one of the ECPMs 204. It will be understood that "cavities" means a region occupied by an ECPM, and does not imply that the space occupied by the ECPMs 204 in the ECPM rotor 202 was necessarily, in a fabrication or assembly step, a distinct unfilled volume.

In an implementation, the ECPM rotor 202 can be configured, for example by selecting an appropriate value for the rotor thickness RT, relative to a diameter DE of the ECPM 204, such that an ECPM first region or portion 204R of the ECPMs 204 projects "outward," meaning in a radial direction away from the rotor axis RA, a distance D1 from the rotor outer surface 302R. For purposes of description, the first region or portion 204R can be referred to as a "ECPM first projection" 204R. The ECPM rotor 202 can likewise be configured such that a second region or portion 204S of the ECPMs 204 projects "inward," meaning in a radial direction toward the rotor axis RA, a distance D2 from the rotor inner surface 202S. For purposes of description, the second region or portion 304R can be referred to as a "ECPM second projection" 204S.

In an implementation, the ECPM support region of the ECPM rotor 202, and the ECPMs 204, can be configured such that D1 and D2 are identical. In another implementation, the ECPM support region of the ECPM rotor 202, and the ECPMs 204, can be configured such that D1 is greater than D2, or vice versa.

Referring to FIG. 2B, the ECPM support region of the ECPM rotor 202, and the ECPMs 204, or both, can be configured such that the ECPM first projection 204R has a width D3, at its "base," meaning its intersection with the rotor outer surface 202R. The ECPM support region of the ECPM rotor 202, and the ECPMs 204, or both, can likewise be configured such that the ECPM second projection 204S has a width D4, at its "base," meaning its intersection with the rotor inner surface 202S.

Referring again to FIG. 2B, the ECPM first projection 204R can be a first convex arcuate projection, and the ECPM second projection 204S can be a second convex arcuate projection. The first convex arcuate projection can be a portion of a larger first convex arcuate portion, for example, an upper semi-cylinder (visible, but not separately numbered) of the FIG. 2B illustrated cylinder implementation of the ECPM 204. The second convex arcuate projection can be a portion of a larger second convex arcuate portion, for example, a lower semi-cylinder (visible, but not separately numbered) of the FIG. 2B illustrated cylinder implementation of the ECPM 204.

Referring to FIG. 2B, each of the embedded PMs can be transversely magnetized with a respective magnetization direction, labeled "MD," in FIG. 2B, that is radial to the rotor axis RA. As will be described in greater detail in later sections, implementations include an alternating polarity configuration, in which the ECPMs 204 are arranged with alternating inward and outward pointed magnetization directions.

Figure 4:
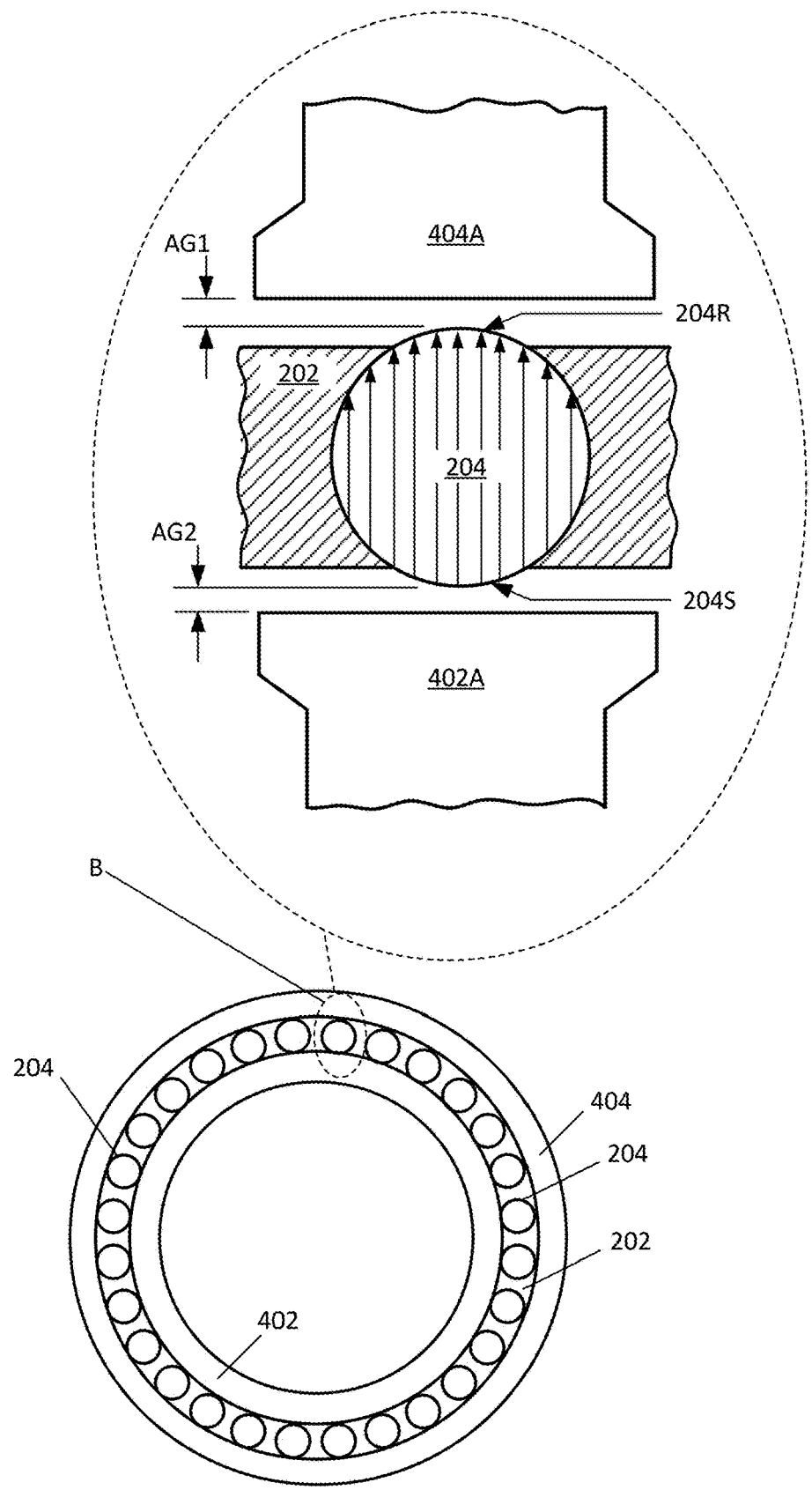
FIG. 4 illustrates one example implementation of an embedded cylindroid PM rotor-axial flux-double stator (ECPM-AX-DS) structure, including an inner stator and an outer stator, for an ECPM-AX-DS-PMBL motor, according to one or more aspects of the present disclosure.

FIG. 4 illustrates one example implementation 400 of an embedded cylindroid PM rotor—double stator structure, hereinafter "DS-ECPM 400," according to one or more aspects of the present disclosure. For convenience, the FIG. 4 example DS-ECPM 400 will be described in reference to the ECPM rotor assembly 200, its ECPM rotor 202, and ECPMs 204, described in reference to FIGS. 2A, 2B, and 3.

Referring to FIG. 4, the DS-ECPM 400 can include an inner stator 402 surrounded, in a concentric arrangement about the rotor axis RA, by the above-described ECPM rotor 200 (not separately numbered in FIG. 4), surrounded in turn by an outer stator 404. As described in reference to FIGS. 2A and 2B, and FIG. 3, implementations include the ECPM rotor assembly 200 being rotatably, for example, by a motor or generator housing. Referring to FIG. 4, such implementations can include the inner stator 402 and outer stator 404 being likewise supported by such a housing.

Referring to the FIG. 4 enlarged view of region "B," the inner stator 402 can include a plurality of inner stator teeth, such as the representative example 402A, and the outer stator 404 can include a plurality of outer stator teeth, such as the representative example 404A.

Referring again to FIG. 4, the ECPM rotor 202, ECPMs 204, inner stator 402, inner stator teeth 402A, outer stator 404, and outer stator teeth 404A, can be configured to provide a first air gap AG1 between the upper or outer edge (visible, but not separately numbered), of the ECPM first projection 204R and an inward (meaning toward the rotor axis RA) facing surface of the outer stator teeth 404A. Similarly, above-referenced structures can be configured to provide second air gap AG2 between a lower or inner (visible, but not separately numbered) of the ECPM second projection 204S and an outward (meaning away the rotor axis RA) facing surface of the inner stator teeth 402A.

Figure 5:
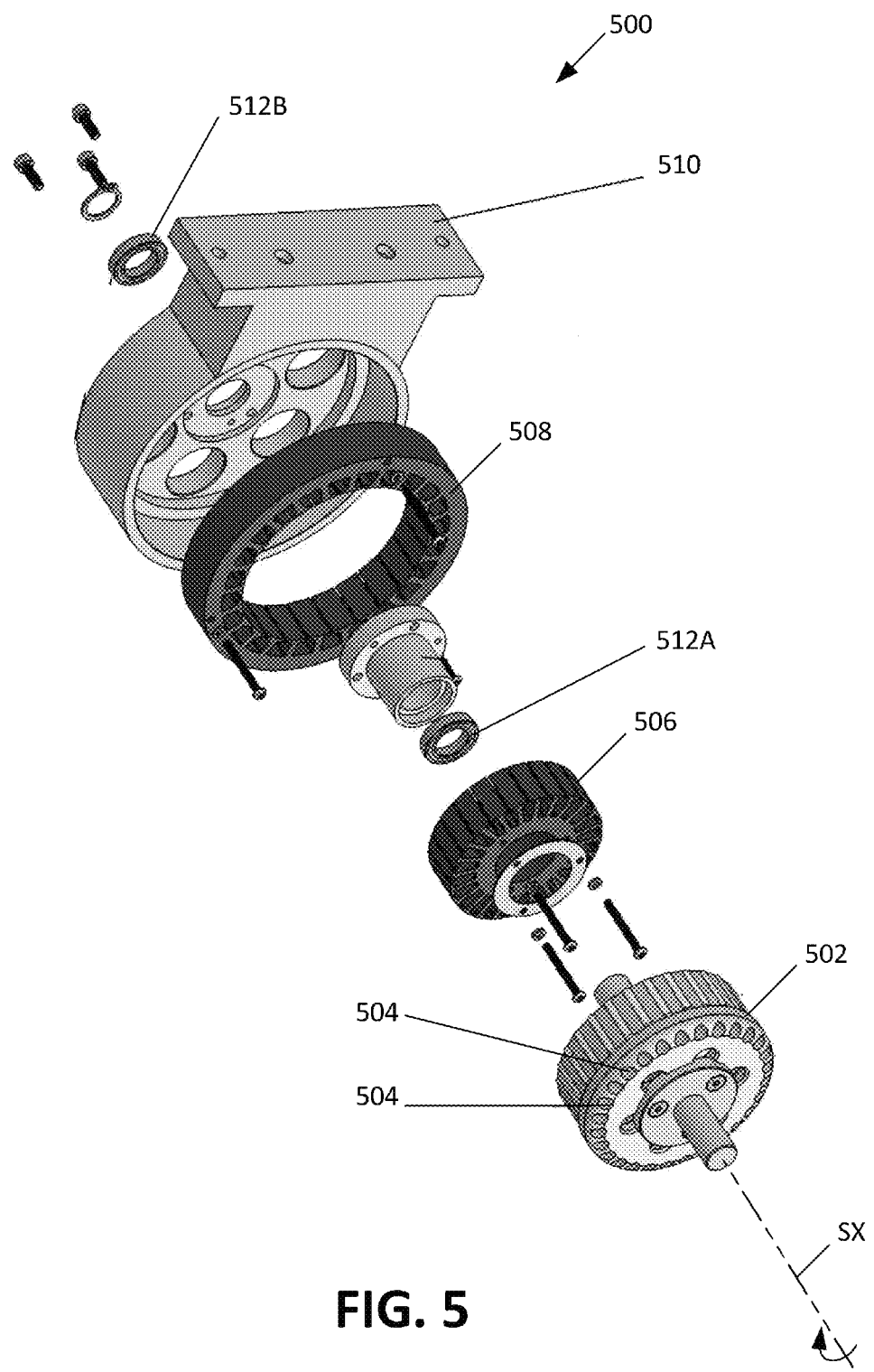
FIG. 5 illustrates one example implementation of one ECPM-AX-DS-PMBL motor, including ECPM rotor assembly, concentric inner stator and outer stator, and other aspects, according to one or more aspects of the present disclosure.

FIG. 5 illustrates one example implementation 500 of an ECPM rotor, axial flux DS-PMBL motor (hereinafter ECPM-AX-DS-PMBL motor 500), including ECPM rotor 502, having an embedded arrangement of ECPMs 504, the ECPM rotor 502 being rotatably, in a concentric arrangement with an inner stator 506 and an outer stator 508, by a support 510. The ECPM rotor 502 and its ECPMs 504 can be configured and structured, for example, in the manner described for the ECPM rotor assembly 200, and its ECPM rotor 202 and ECPMs 204. Referring to FIG. 5, one example structure for rotatably supporting the ECPM rotor 502 can include ball bearings 512A and 512B, secured to the support 510. The ECPM rotor 502 can thereby rotate about a rotor axis SX.

Figure 6A:
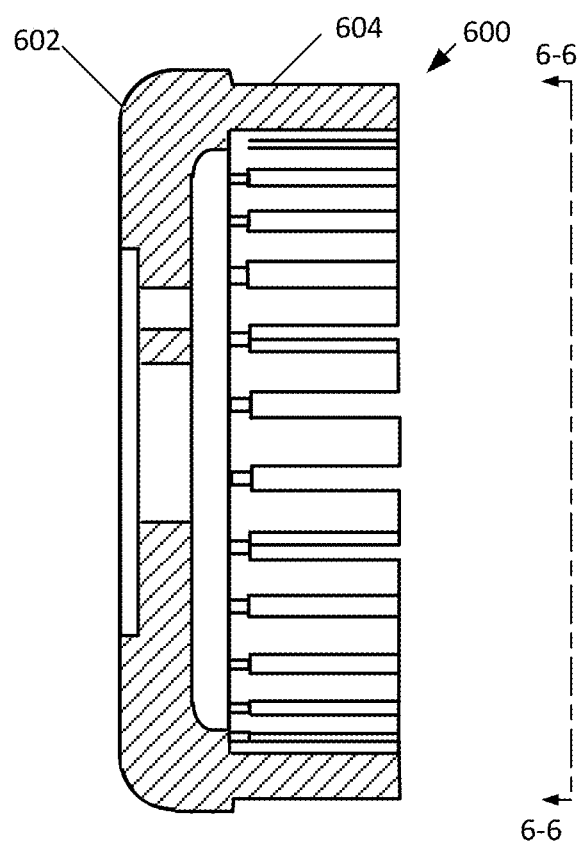
FIG. 6A illustrates in a greater detail an example configuration for the ECPM rotor assembly of the FIG. 5 illustrated ECPM-AX-DS-PMBL motor, according to one or more features and aspects of the present disclosure.
Figure 6B:
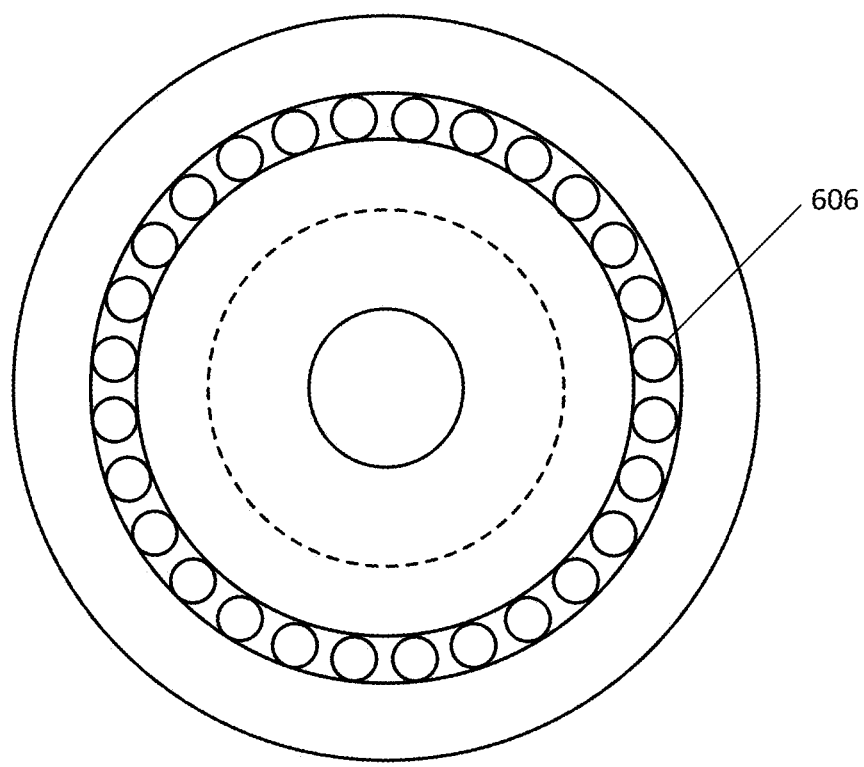
FIG. 6B illustrates a front projection view on the FIG. 6A projection plane 7-7.

FIG. 6A illustrates, in an isolated view, on a projection plane normal to the rotor axis SX, a configuration 600 for the ECPM rotor assembly of the FIG. 5 illustrated ECPM-AX-DS-PMBL motor 500, according to one or more features and aspects of the present disclosure. FIG. 6B illustrates a front projection view on the FIG. 6A projection plane 6-6.

Referring to FIG. 6A, the configuration 600 can include rotor flange 602 attached to a rotor body 604. The rotor body 604 can include cavities 606 for supporting the ECPMs 504 in FIG. 5.

Figure 7A:
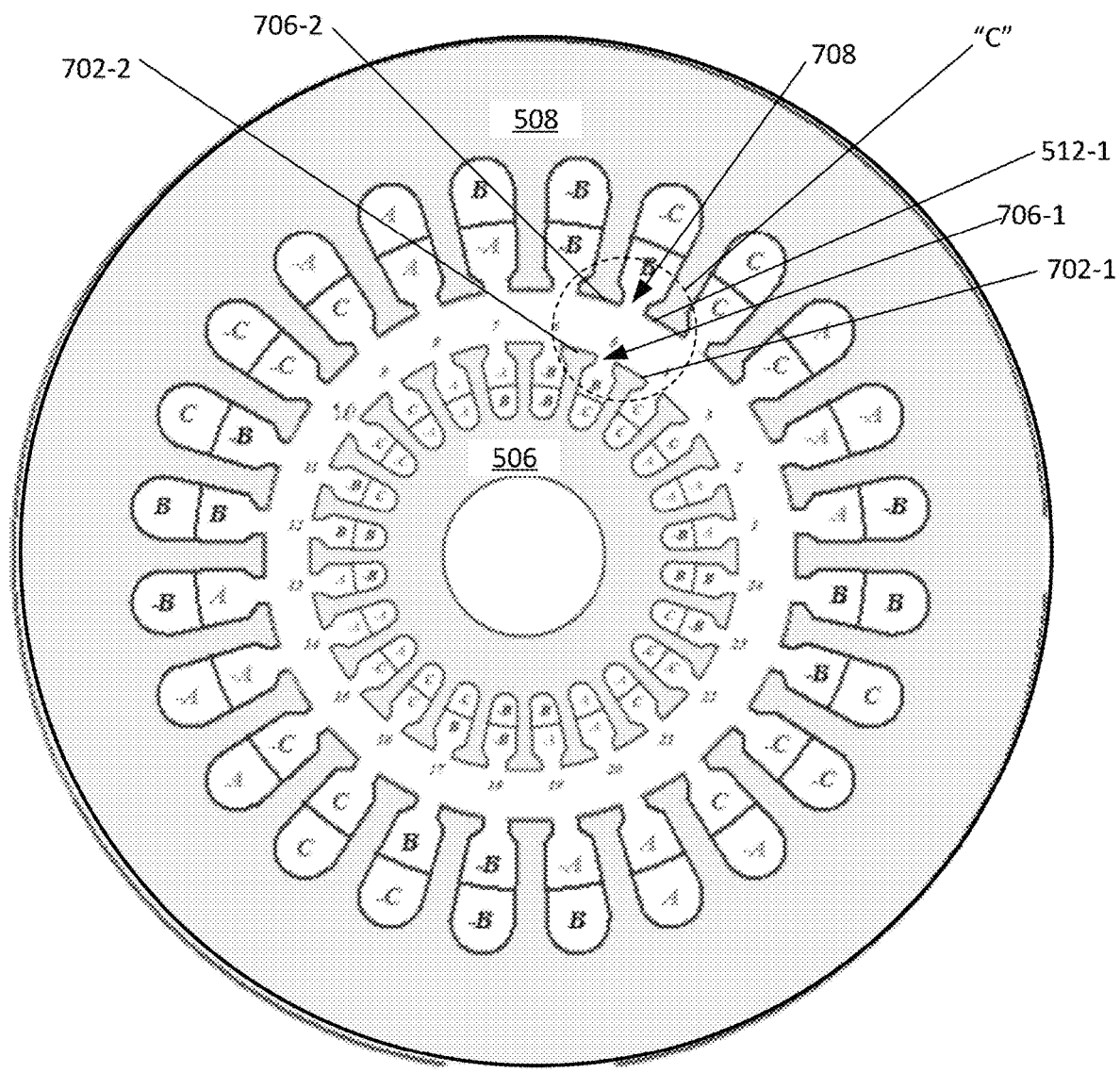
FIG. 7A illustrates an example of an as-assembled configuration for the inner stator and outer stator of the FIG. 5 illustrated ECPM-AX-DS-PMBL motor, viewed from a projection plane normal to the rotor axis, and respective stator tooth arrangements, according to, one or more aspects of the present disclosure.

FIG. 7A illustrates example an-assembled configuration for the inner stator 506 and outer stator 508 of the FIG. 5 illustrated ECPM-AX-DS-PMBL motor 500, viewed from a projection plane normal to the rotor axis SX, and respective stator tooth arrangements, according to one or more aspects of the present disclosure. Image region "C" illustrates representative adjacent inner stator teeth 702-1 and 702-2, and spaced by an inner stator slot 704, and adjacent outer stator teeth 706-1 and 706-2, and spaced by an outer stator slot 708. Structure illustrated in image region C is modeled by a FIG. 8 flux and reluctance model described later in greater detail.

Figure 7B:
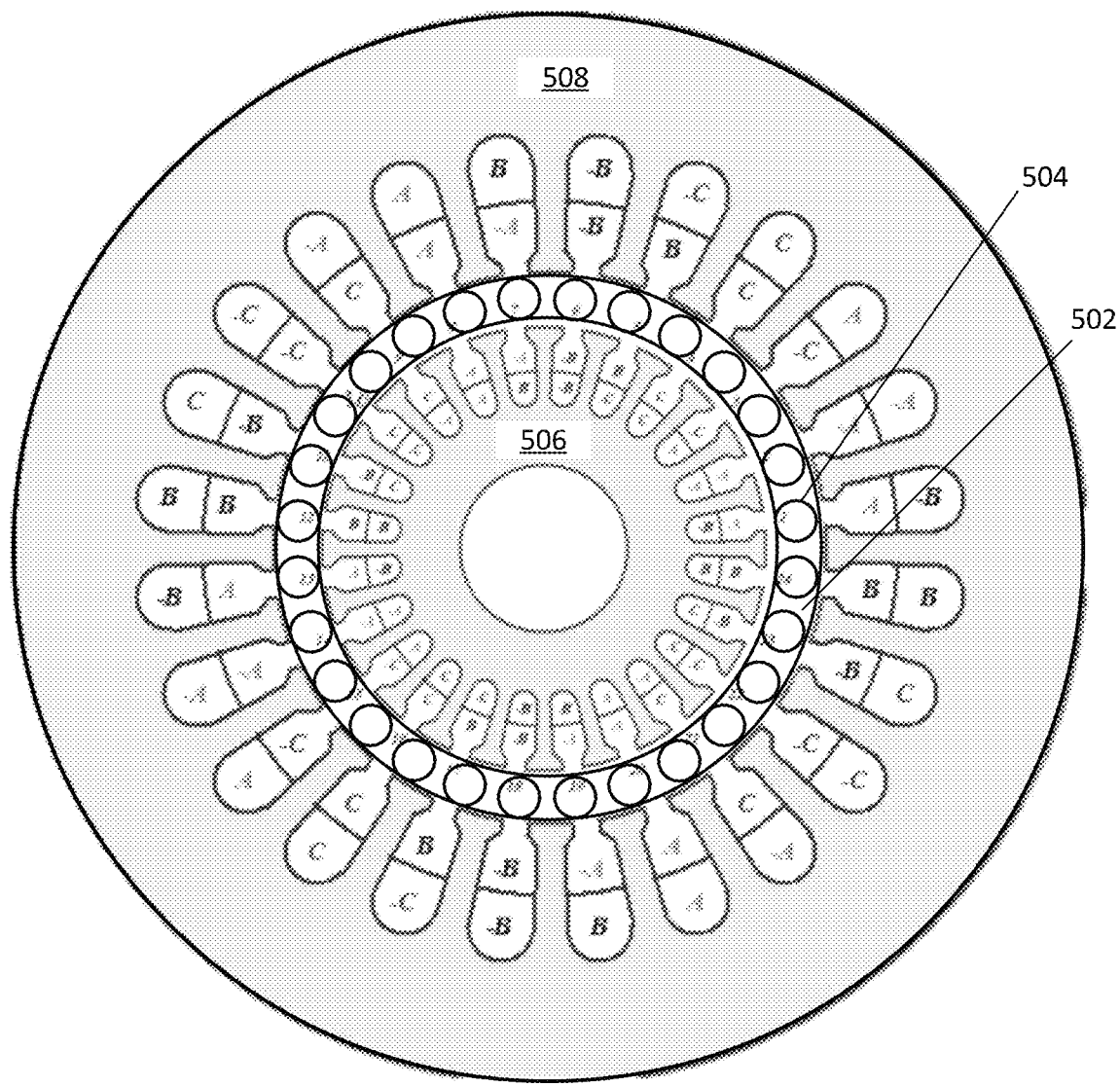
FIG. 7B illustrates the FIG. 7A inner stator and outer stator, in the as-assembled configuration, further assembled with the FIG. 6A-6B ECPM rotor, in an example according to one or more aspects of the present disclosure.

FIG. 7B illustrates the FIG. 7A inner stator 506 and outer stator 508, in the as-assembled configuration, further assembled with the FIG. 5A-5B ECPM rotor 502 and its ECPMs 504, in an example according to one or more aspects of the present disclosure.

Figure 8:
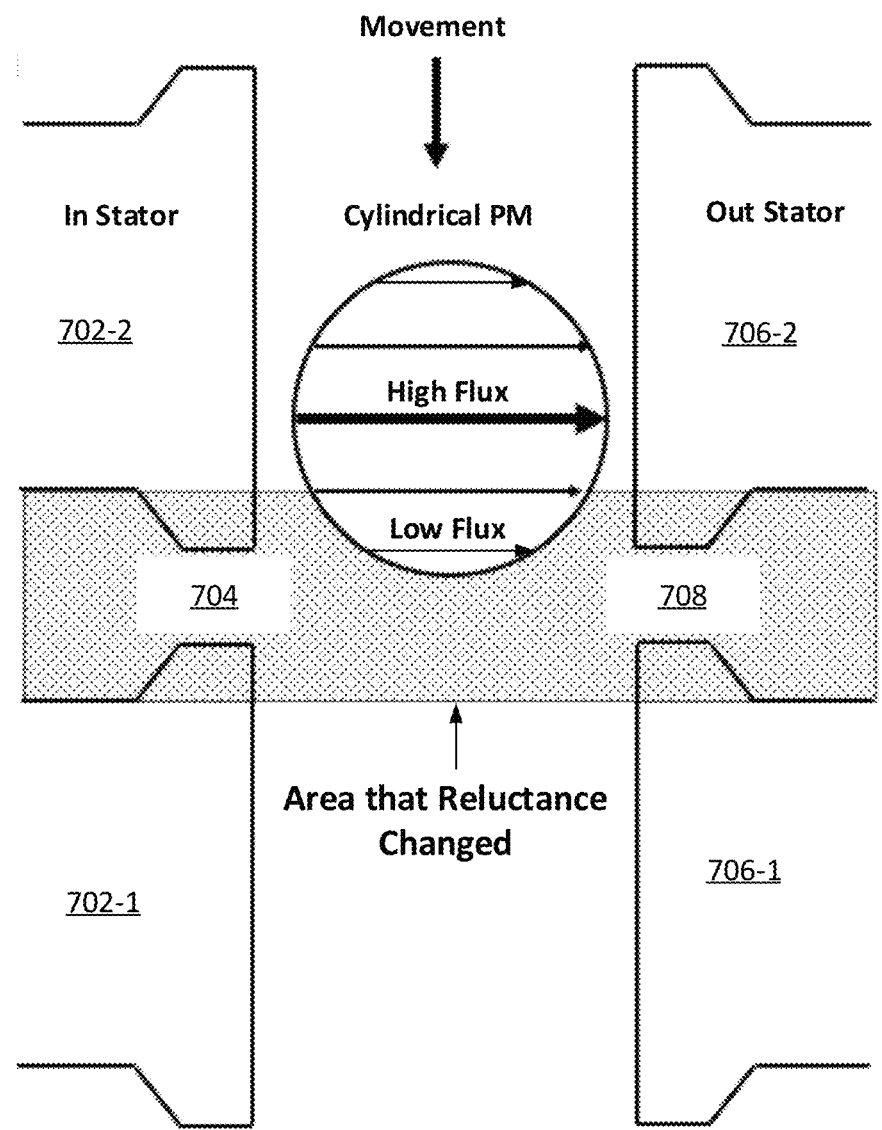
FIG. 8 illustrates a flux model, showing reluctance values and changes of same, with respect to angular relation between an ECPM and inner and outer stator slots, provided by ECPM rotor structures and techniques according to one or more aspects of the present disclosure.
Figure 11:
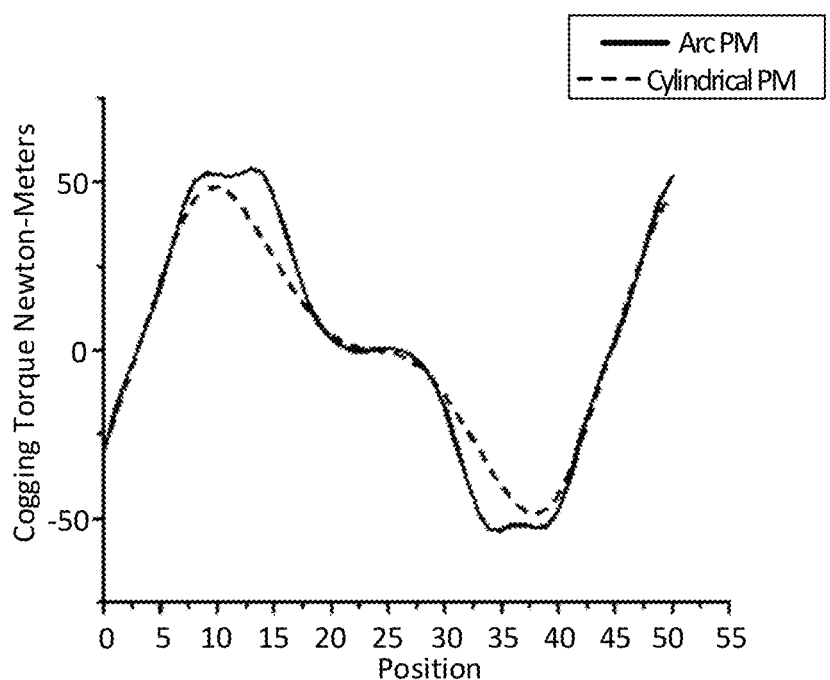
FIG. 11 illustrates a graphical plot of simulation results based on the flux model of FIG. 8.
Figure 12:
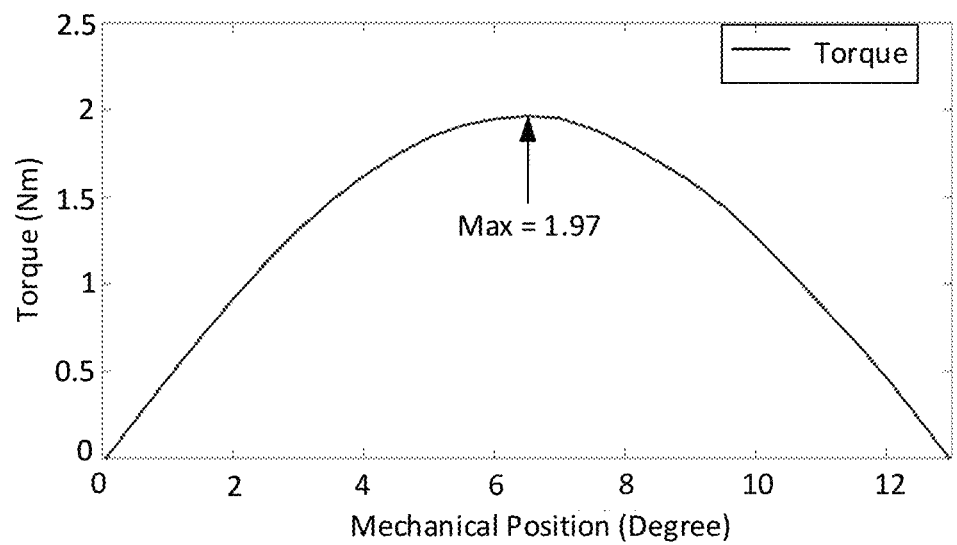
FIG. 12 illustrates a torque simulation plot associated with FIG. 11, using the flux model of FIG. 8, employing ECPM rotor structures and techniques according to one or more aspects of the present disclosure.

FIG. 8 illustrates a flux and reluctance model of a structure within the FIG. 7A region C, for modelling reluctance value with respect to the angular position of an arbitrary one of the ECPM 504s illustrated in FIGS. 5A-5B and FIG. 7B, relative to the region C inner stator slot 704 and outer stator slot 708. Simulation results using the FIG. 8 flux model are illustrated in FIGS. 11 and 12.

Figure 9:
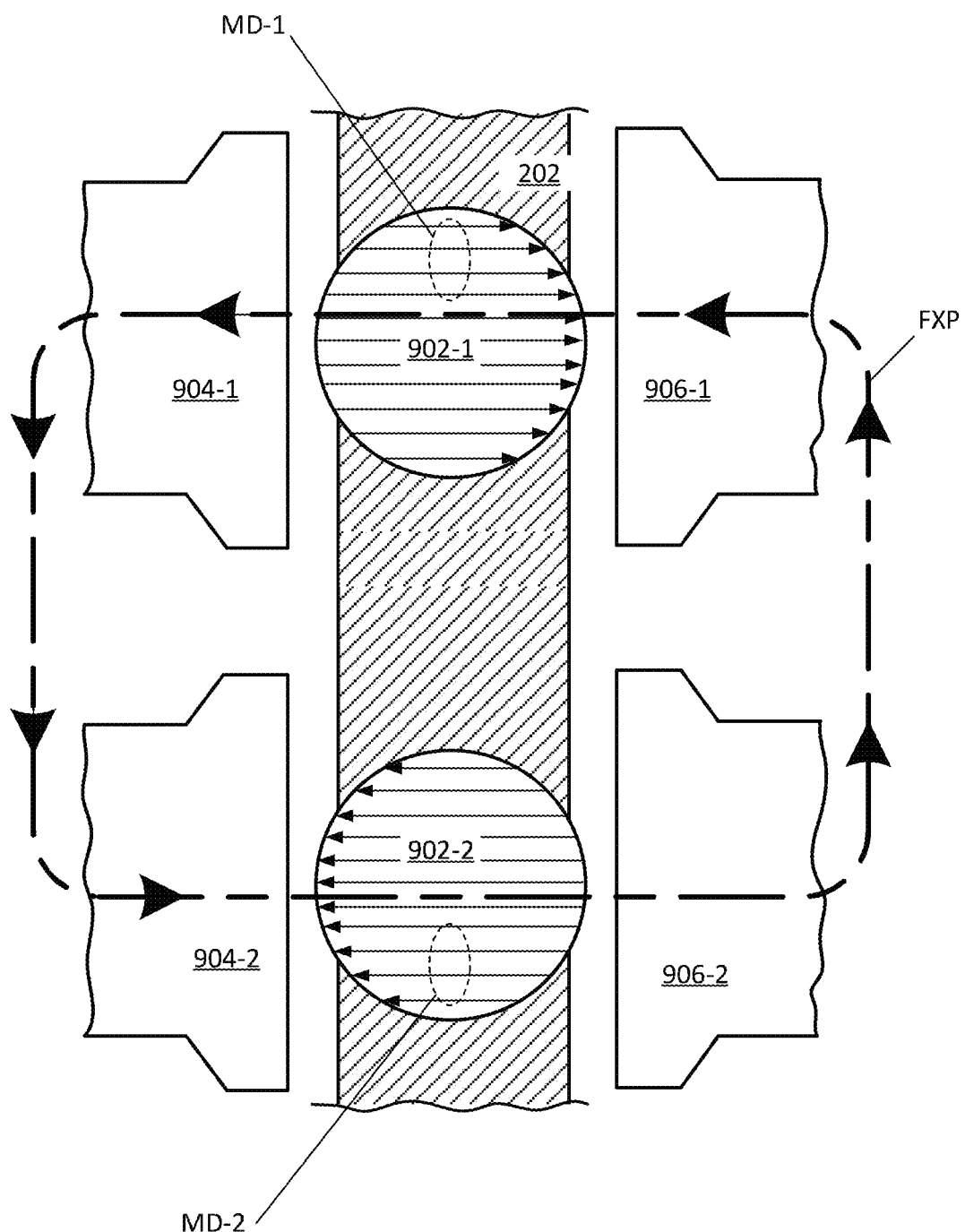
FIG. 9 illustrates another flux model, showing cooperative aspects on a pole pair state, provided by ECPM rotor structures and techniques according to one or more aspects of the present disclosure.

FIG. 9 illustrates another flux model, showing cooperative aspects on a pole pair state, provided by embedded cylindroid PM rotor structures and techniques according to one or more aspects of the present disclosure. Referring to FIGS. 4 and 9, it will be assumed that the ECPM rotor 202 supports a plurality of ECPMs 204, having alternating directions of magnetization. An example can be the FIG. 9 first ECPM 902-1, mounted in the ECPM rotor 202, adjacent to a second ECPM 902-2, having a second magnetization direction MD-2 opposite to MD-1. The alignment can include the first ECPM 902-1 being aligned with a first stator tooth 904-1 of the inner stator 402, and a first stator tooth 906-1 of the outer stator 404, concurrent with the second ECPM 902-2 being aligned with a second stator tooth 904-2 of the inner stator 402, and the second stator tooth 906-2 of the outer stator 404. In this alignment, the flux path FXP can pass from the first tooth 906-1 of the outer stator 404, into the outward projection (visible but not separately numbered) of the first ECPM 902-1, then transversely through the first ECPM 902-1, in an alignment with the first transverse magnetization direction MD-1, then from the inward projection (visible but not separately numbered) of the first ECPM 902-1 into the first tooth 904-1 of the inner stator 402, then to the second tooth 904-2 of the inner stator 402. The flux path FXP can continue, from the second tooth 904-2 of the inner stator 402 into the inward projection (visible but not separately numbered) of the second ECPM 902-2, then transversely through the second ECPM 902-2, in an alignment with the second transverse magnetization direction MP-2, and then from the outward projection (visible but not separately numbered) of the second ECPM 902-2 into the second tooth 906-2 of the outer stator 404.

Figure 10A:
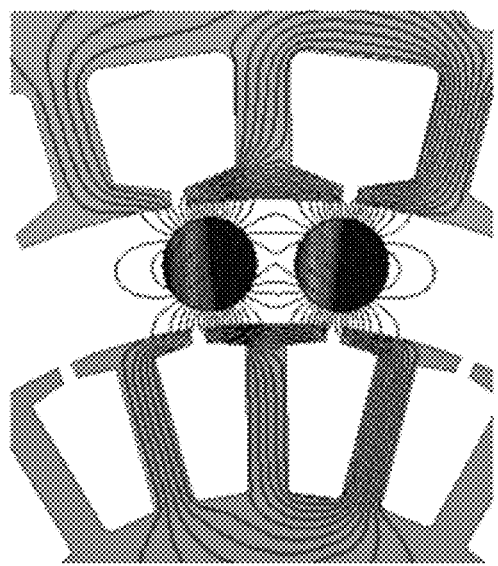
FIG. 10A illustrates a simulation flux model of adjacent conventional technique permanent magnets, in respective alignment with adjacent inner stator slots and an outer stator slots.

FIG. 10A illustrates a simulation flux model of adjacent conventional technique permanent magnets, in respective alignment with adjacent inner stator slots and an outer stator slots.

Figure 10B:
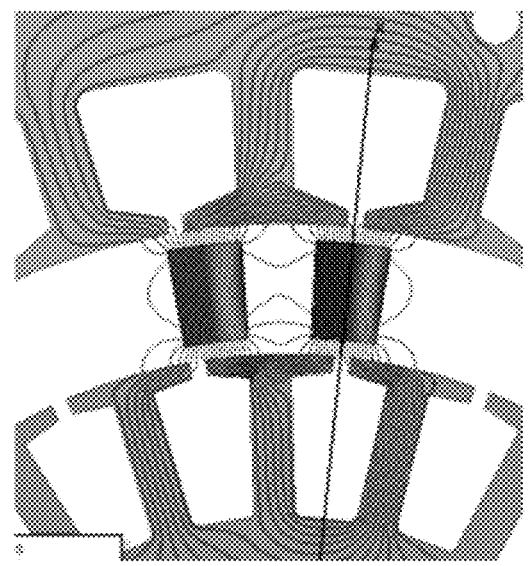
FIG. 10B illustrates, for a comparison to FIG. 10A, a simulation flux model of adjacent ECPMs, in respective alignment with adjacent inner stator slots and an outer stator slots, in an example of ECPM rotor structures and techniques according to one or more aspects of the present disclosure.

FIG. 10B illustrates, for a comparison to FIG. 10A, a simulation flux model of adjacent ECPMs, in respective alignment with adjacent inner stator slots and an outer stator slots, in an example of ECPM rotor structures and techniques according to one or more aspects of the present disclosure.

FIG. 11 illustrates a graphical plot of simulation results based on the flux model of FIG. 8.

FIG. 12 illustrates a torque simulation plot associated with FIG. 11, using the flux model of FIG. 8, employing ECPM rotor structures and techniques according to one or more aspects of the present disclosure.

Figure 13:
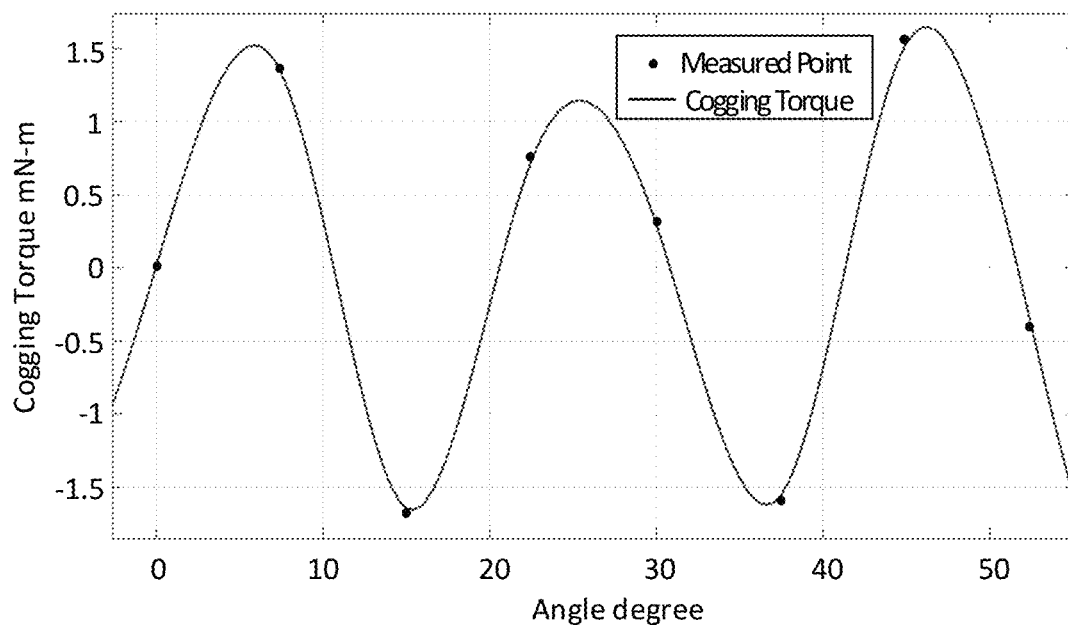
FIG. 13 illustrates a cogging torque plot based on measurements of a prototype employing ECPM rotor structures and techniques according to one or more aspects of the present disclosure.

FIG. 13 illustrates a cogging torque plot based on measurements of a prototype employing embedded cylindroid PM rotor structures and techniques according to one or more aspects of the present disclosure.

As illustrated by FIGS. 10A, 10B, 11, 12 and 13, the measured torque-angle characteristic and the cogging torque shows that ECPM according to disclosed structures and methods, and aspects thereof, reduced the cogging torque significantly. The maximum torque produced by a prototyped motor was shown to be 2.1 N-m, while the peak to peak amount of the cogging torque equals 3.2 mN-m, which is less than 0.2 percent of the maximum torque. The design constraints and nominal values are listed in Table 1 below.

Rotors employing embedded cylindroid permanent magnets, in accordance with this disclosure, can provide a wide range of significant technical features and benefits. Among these can be a significantly reduced togging torque and associated reduction in noise and vibration and, concurrently, an ability to use a higher number of poles to increase the torque density. Further technical features can include a symmetrical rotor structure, and this can provide further benefits and costs reduction. Another significant technical that can be provided is an ease of lodging the PMs. For example, there need for epoxy may be eliminated. Also, the need or requirement for a guard may be reduced, or eliminated. Still another technical benefit is the likely lower cost of the cylindrical PMs compared to arc shape types. Motors employing embedded cylindroid permanent magnets, in accordance with this disclosure, can also provide improvement in mechanical strength, and can provide a faster dynamical response. As related and further benefit is the enablement of using aluminum alloy for the rotor structure.

Two of the main applications are in-wheel drives for electric vehicles, and direct drives for washing machines. In these applications, electric motors should produce high torques at low speeds. The high torque-density parameter makes motors lighter and more compact, which is very important for in-wheel drive electric vehicles and direct drive washing machines.

For practices according to disclosed aspects, in at least some applications, it may be, but is not necessarily preferential to select the diameter of the cylindroid permanent magnet equal or smaller than the width of the tooth. This diameter can be obtained, for example, by using the fractional slot structure with slot per pole per phase less than unity (q<1).

For practices according to disclosed aspects, in at least some applications it may be, but is not necessarily preferential to use a concentrated winding structure.

One particular design process that may, in some applications, provide benefits in practices according to this disclosure can include a preliminary step of determining constraints and design variables. Non-limiting examples are set, forth in Table I. An example practice can then proceed to a selecting of the pole-pair number, and can then proceed to a designing of the winding layout. In some instances, after the designing of the winding layout, the design process can verify or check if the inner and outer air gap radii requirements or goals are met. If they are not, it may be preferable to adjust the pole-pair numbers, and return to repeat the designing of the winding layout. If the inner and outer air gap radii are met, a next step can include applying Finite Element Model analysis(FEM) analysis to calculate cogging torque and maximum torque. If the FEM analysis indicates the cogging torque and maximum torque targets are met, the design process can be complete. If the FEM analysis indicates that cogging torque and maximum torque targets are not met, the process can proceed to adjust the parameters and, return to selecting the pole-pair number, and perform another of the described iterations.

TABLE I

RATED VALUES AND DESIGN CONSTRAINTS

| Parameter | Value Rated Values | Parameter | Value Design Constraints |
|---|---|---|---|
| $V_{ph}$ | 2.5 V | $R_o$ | 117 mm |
| $n_{sync}$ | 214 rpm | $R_{in}$ | 30 mm |
| f | 50 Hz | Axial length | 20 mm |
| m | 3 | $R_{PM}$ | 6 mm |
| I | 8 A | P | 28 |
| S | 60 VA | Radial air gape length | 1 mm |

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the disclosed teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended encompassment of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure.

It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A permanent magnet electric motor, comprising:
a rotor, extending along a rotor axis, and rotatably supported by a support member for rotation about the rotor axis, the rotor comprising:
a rotor inner surface, and
a rotor outer surface that is concentric to the rotor axis and that faces away from the rotor axis;
a plurality of cylindroid permanent magnets, mounted to the rotor at respective positions along a reference circle concentric with the rotor axis, wherein:
each of the cylindroid permanent magnets extends along an axis parallel to the rotor axis, and
is transversely magnetized with a respective magnetization direction that is radial to the rotor axis;
an outer stator, coupled to the support member, and aligned with the rotor axis; and
an inner stator, coupled to the support member and aligned with the rotor axis;
wherein the rotor inner surface faces toward the inner stator.

2. The permanent magnet electric motor of claim 1, wherein:
at least one of the cylindroid permanent magnets is a cylindrical permanent magnet, and extends along a cylinder axis, the cylinder axis extending parallel to the rotor axis and within a cavity in which the cylindrical permanent magnet is mounted.

3. The permanent magnet electric motor of claim 1, wherein:
at least one of the plurality of cylindroid permanent magnets is transversely magnetized in a first transverse direction, the first transverse direction being toward the rotor axis, and
at least one of the plurality of cylindroid permanent magnets is transversely magnetized in a second transverse direction, the second transverse direction being away from the rotor axis.

4. The permanent magnet electric motor of claim 3, wherein:
the plurality of cylindroid permanent magnets comprises N cylindroid permanent magnets, N being an even integer greater than two,
N/2 of the transversely cylindroid permanent magnets are transversely magnetized in the first transverse direction, and
N/2 of the transversely cylindroid permanent magnets are transversely magnetized in the second transverse direction.

5. The permanent magnet electric motor of claim 1, wherein the rotor includes structure forming a plurality of cavities, and the plurality of cavities are aligned at the respective positions along the reference circle, and each of the cylindroid permanent magnets is mounted within a respective one of the cavities.

6. The permanent magnet electric motor of claim 5, wherein the rotor comprises:
for each of the cavities, an opening to an area on the rotor outer surface and extending parallel to the rotor axis, wherein:
a surface of the cylindroid permanent magnet mounted within the cavity projects through the opening, forming a projection that is above the rotor outer surface and runs parallel to the rotor axis.

7. The permanent magnet electric motor of claim 6, wherein the cylindroid permanent magnet mounted within the cavity is a cylindrical permanent magnet, extending along a cylinder axis and having a radius that is normal to the cylinder axis, and
wherein the projection forms a radius equal to radius of the cylindrical permanent magnet.

8. The permanent magnet electric motor of claim 7, wherein the projection has a width at the outer rotor outer surface, and the width is less than the radius of the cylindrical permanent magnet.

9. The permanent magnet electric motor of claim 7, wherein:
the projection is an outward projection, the opening is a first opening, and
the rotor further comprises:
for each of the cavities, a second opening out to the rotor inner surface, and running in a direction parallel to the rotor axis; wherein:
a surface of the cylindroid permanent magnet mounted within the cavity projects through the second opening, forming an inward projection that is inward of the rotor inner surface, in a radial direction toward the rotor axis, and runs parallel to the outward projection.

10. The permanent magnet electric motor of claim 9, wherein:
at least one of the cylindroid permanent magnets is a cylindrical permanent magnet, and extends along a cylinder axis, the cylinder axis extending parallel to the rotor axis and within the cavity in which the cylindrical permanent magnet is mounted.

11. The permanent magnet electric motor of claim 9, wherein:
a first cylindroid permanent magnet, among the plurality of cylindroid permanent magnets is transversely magnetized in a first transverse direction, and the cavity in which the first cylindroid permanent magnet is mounted is a first cavity, and
a second cylindroid permanent magnet, among the plurality of cylindroid permanent magnets is transversely magnetized in a second transverse direction, opposite the transverse direction, and the cavity in which the second cylindroid permanent magnet is mounted is a second cavity, and
at a given rotational position of the rotor, a concurrent alignment is formed, the concurrent alignment including:
a first mutual alignment, including an alignment of the outward projection of the first cylindroid permanent magnet, with a first tooth of the outer stator, and an alignment of the inward projection of the first cylindroid permanent magnet with a first tooth of the inner stator, and
concurrent with the first mutual alignment, a second mutual alignment, the second mutual alignment including an alignment of the outward projection of the second cylindroid permanent magnet with a second tooth of the outer stator, and an alignment of the inward projection of the second cylindroid permanent magnet with a second tooth of the inner stator, the first tooth of the outer stator being adjacent the second tooth of the outer stator.

12. The permanent magnet electric motor of claim 11, wherein the first cylindroid permanent magnet, the second cylindroid permanent magnet, the first tooth and the second tooth of the outer stator, the first tooth and the second tooth of the inner stator are configured to form, in the concurrent alignment, a flux path,
wherein the flux path passes:
from the first tooth of the outer stator, into the outward projection of the first cylindroid permanent magnet, then
transversely through the first cylindroid permanent magnet, in an alignment with the first transverse magnetization direction, and from the inward projection of the first cylindroid permanent magnet into the first tooth of the inner stator, then
from the first tooth of the inner stator to the second tooth of the inner stator, then
from the second tooth of the inner stator to the second into the inward projection of the second cylindroid permanent magnet, then
transversely through the second cylindroid permanent magnet, in an alignment with the second transverse magnetization direction, and then
from the outward projection of the second cylindroid permanent magnet into the second tooth of the outer stator.

13. A permanent magnet electric motor, comprising:
a rotor, extending along a rotor axis, and rotatably supported by a support member for rotation about the rotor axis, the rotor comprising:
a rotor inner surface;
a rotor outer surface that is concentric to the rotor axis and that faces away from the rotor axis;
a structure forming a plurality of cavities;
for each of the cavities, a first opening to an area on the rotor surface and extending parallel to the rotor axis;
for each of the cavities, a second opening out to the rotor inner surface, and running in a direction parallel to the rotor axis;
a plurality of cylindroid permanent magnets, mounted to the rotor at respective positions along a reference circle concentric with the rotor axis, wherein:
each of the plurality of cylindroid permanent magnets extends along an axis parallel to the rotor axis; and
is transversely magnetized with a respective magnetization direction that is radial to the rotor axis; and
an outer stator, coupled to the support member, and aligned with the rotor axis; and
an inner stator, coupled to the support member and aligned with the rotor axis;
wherein:
the rotor inner surface faces toward the inner stator;
the plurality of cavities are aligned at the respective positions along the reference circle;
each of the plurality of cylindroid permanent magnets is mounted within a respective cavity of the plurality of cavities and projects through the first opening, forming an outward projection that is above the rotor outer surface and runs parallel to the rotor axis; and
a surface of each of the plurality of cylindroid permanent magnets projects through the second opening, forming an inward projection that is inward of the inner surface of the rotor, in a radial direction toward the rotor axis, and runs parallel to the outward projection.

14. The permanent magnet electric motor of claim 13, wherein:
at least one of the cylindroid permanent magnets is a cylindrical permanent magnet and extends along a cylinder axis, the cylinder axis extending parallel to the rotor axis and within a cavity of the plurality of cavities in which the cylindrical permanent magnet is mounted.

15. The permanent magnet electric motor of claim 13, wherein:
at least one of the plurality of cylindroid permanent magnets is transversely magnetized in a first transverse direction, the first transverse direction being toward the rotor axis; and
at least one of the plurality of cylindroid permanent magnets is transversely magnetized in a second transverse direction, the second transverse direction being away from the rotor axis.

16. The permanent magnet electric motor of claim 13, wherein:
the plurality of cylindroid permanent magnets comprises N cylindroid permanent magnets, N being an even integer greater than two;
N/2 of the transversely cylindroid permanent magnets are transversely magnetized in the first transverse direction; and
N/2 of the transversely cylindroid permanent magnets are transversely magnetized in the second transverse direction.

17. The permanent magnet electric motor of claim 13, wherein:
each of the cylindroid permanent magnets mounted within a respective cavity of the plurality of cavities is a cylindrical permanent magnet, extending along a cylinder axis and having a radius that is normal to the cylinder axis, and
the outward projection forms a radius equal to a radius of the cylindrical permanent magnet.

18. The permanent magnet electric motor of claim 17, wherein the outward projection has a width at the rotor outer surface, the width being less than the radius of the cylindrical permanent magnet.

19. The permanent magnet electric motor of claim 13, wherein:
a first cylindroid permanent magnet of the plurality of cylindroid permanent magnets is transversely magnetized in a first transverse direction, and a respective cavity of the plurality of cavities in which the first cylindroid permanent magnet is mounted is a first cavity;
a second cylindroid permanent magnet of the plurality of cylindroid permanent magnets is transversely magnetized in a second transverse direction opposite the transverse direction and a respective cavity of the plurality of cavities in which the second cylindroid permanent magnet is mounted is a second cavity; and
at a given rotational position of the rotor, a concurrent alignment is formed, the concurrent alignment comprising:
a first mutual alignment comprising:

an alignment of the outward projection of the first cylindroid permanent magnet with a first tooth of the outer stator; and an alignment of the inward projection of the first cylindroid permanent magnet with a first tooth of the inner stator; and concurrent with the first mutual alignment, a second mutual alignment comprising:

an alignment of the outward projection of the second cylindroid permanent magnet with a second tooth of the outer stator; and an alignment of the inward projection of the second cylindroid permanent magnet with a second tooth of the inner stator, the first tooth of the outer stator being adjacent the second tooth of the outer stator.

20. The permanent magnet electric motor of claim 19, wherein the first cylindroid permanent magnet, the second cylindroid permanent magnet, the first tooth of the outer stator, the second tooth of the outer stator, the first tooth of the inner stator, and the second tooth of the inner stator are configured to form, in the concurrent alignment, a flux path passing:

from the first tooth of the outer stator into the outward projection of the first cylindroid permanent magnet, then transversely through the first cylindroid permanent magnet in an alignment with the first transverse magnetization direction, and from the inward projection of the first cylindroid permanent magnet into the first tooth of the inner stator, then from the first tooth of the inner stator to the second tooth of the inner stator, then from the second tooth of the inner stator to the second into the inward projection of the second cylindroid permanent magnet, then transversely through the second cylindroid permanent magnet in an alignment with the second transverse magnetization direction, and then from the outward projection of the second cylindroid permanent magnet into the second tooth of the outer stator.

* * * * *